US012491079B2

(12) United States Patent
Kang

(10) Patent No.: US 12,491,079 B2
(45) Date of Patent: Dec. 9, 2025

(54) HEIGHT-ADJUSTABLE SPINAL FUSION CAGE

(71) Applicant: L&K BIOMED CO., LTD., Yongin-si (KR)

(72) Inventor: Gook Jin Kang, Seoul (KR)

(73) Assignee: L&K BIOMED CO., LTD., Yongin-si (KR)

( * ) Notice: Subject to any disclaimer, the term of this patent is extended or adjusted under 35 U.S.C. 154(b) by 484 days.

(21) Appl. No.: 17/909,597

(22) PCT Filed: Nov. 6, 2020

(86) PCT No.: PCT/KR2020/015457
§ 371 (c)(1),
(2) Date: Sep. 6, 2022

(87) PCT Pub. No.: WO2021/177543
PCT Pub. Date: Sep. 10, 2021

(65) Prior Publication Data
US 2023/0114356 A1  Apr. 13, 2023

(30) Foreign Application Priority Data
Mar. 6, 2020  (KR) ........................ 10-2020-0028480

(51) Int. Cl.
*A61F 2/44* (2006.01)
*A61F 2/30* (2006.01)

(52) U.S. Cl.
CPC .. *A61F 2/4455* (2013.01); *A61F 2002/30398* (2013.01); *A61F 2002/3055* (2013.01); *A61F 2002/30797* (2013.01)

(58) Field of Classification Search
CPC ...... A61F 2/4455–447; A61F 2250/0004–001; A61F 2250/0048
See application file for complete search history.

(56) References Cited

U.S. PATENT DOCUMENTS 6,951,561 B2   10/2005  Warren et al.
8,257,398 B2    9/2012  Jackson
(Continued)

FOREIGN PATENT DOCUMENTS

JP   2010-516388 A   5/2010
JP   2016-538953 A   12/2016
(Continued)

OTHER PUBLICATIONS

Office Action issued Sep. 5, 2023 in Japanese Application No. 2022-553626.
(Continued)

*Primary Examiner* — Eduardo C Robert
*Assistant Examiner* — Anna V. Little
(74) *Attorney, Agent, or Firm* — Sughrue Mion, PLLC

(57) ABSTRACT

The present invention relates to a spinal fusion cage which is inserted between vertebral bodies in a state where the cage has the lowest height, is height-adjustable in the inserted state, and can simplify a height adjustment mechanism, thus making it possible to replace cages having heights in a certain range by a single cage. Therefore, manufacturers can reduce product groups that need to be produced, and can also reduce product stock. Further, in contrast to the conventional cages having predetermined heights at regular intervals, the height of the inventive cage can be linearly adjusted according to the distance between the vertebral bodies of a patient, and thus a surgery can be performed using the cage adjusted to an optimum height according to the patient's condition.

20 Claims, 21 Drawing Sheets

(56) References Cited

U.S. PATENT DOCUMENTS

| | | | |
|---|---|---|---|
| 9,585,762 | B2 | 3/2017 | Suddaby et al. |
| 9,668,876 | B2 | 6/2017 | Blain et al. |
| 9,987,144 | B2 | 6/2018 | Seifert et al. |
| 10,034,765 | B2 | 7/2018 | Blain et al. |
| 10,034,767 | B2 | 7/2018 | Baynham |
| 10,646,351 | B2 | 5/2020 | Blain et al. |
| 10,959,856 | B2 | 3/2021 | Seifert et al. |
| 2003/0074064 | A1 | 4/2003 | Gerbec et al. |
| 2006/0224241 | A1 | 10/2006 | Butler et al. |
| 2008/0114457 | A1* | 5/2008 | Barker ............... A61F 2/44 606/151 |
| 2008/0140136 | A1 | 6/2008 | Jackson |
| 2008/0140207 | A1 | 6/2008 | Olmos et al. |
| 2008/0281425 | A1* | 11/2008 | Thalgott ............. A61F 2/447 623/17.16 |
| 2011/0270396 | A1* | 11/2011 | Leibowitz ........... A61F 2/4611 623/17.11 |
| 2012/0071978 | A1* | 3/2012 | Suedkamp .......... A61B 17/86 623/17.16 |
| 2013/0103095 | A1* | 4/2013 | Brumfield .......... A61B 17/7064 606/301 |
| 2014/0277487 | A1 | 9/2014 | Davenport et al. |
| 2015/0190242 | A1 | 7/2015 | Blain et al. |
| 2015/0374507 | A1* | 12/2015 | Wolters ............. A61B 17/8858 623/17.15 |
| 2016/0081814 | A1* | 3/2016 | Baynham ............. A61F 2/447 623/17.16 |
| 2017/0014240 | A1 | 1/2017 | Seifert et al. |
| 2017/0151065 | A1* | 6/2017 | Warren ............... A61F 2/4601 |
| 2017/0224505 | A1 | 8/2017 | Butler et al. |
| 2017/0231780 | A1 | 8/2017 | D'Urso |
| 2017/0258605 | A1 | 9/2017 | Blain et al. |
| 2017/0325966 | A1 | 11/2017 | Capote et al. |
| 2018/0193160 | A1 | 7/2018 | Hsu et al. |
| 2018/0318102 | A1 | 11/2018 | Seifert et al. |
| 2018/0333273 | A1 | 11/2018 | Blain et al. |
| 2019/0133782 | A1 | 5/2019 | McLaughlin et al. |
| 2019/0358057 | A1* | 11/2019 | McLaughlin ........ A61B 17/86 |
| 2020/0276028 | A1 | 9/2020 | Blain et al. |

FOREIGN PATENT DOCUMENTS

| | | | |
|---|---|---|---|
| JP | 2018-520792 A | 8/2018 | |
| KR | 10-2117224 B1 | 6/2020 | |
| WO | WO-2019136263 A1 * | 7/2019 | ......... A61F 2/30749 |

OTHER PUBLICATIONS

Extended European Search Report dated Mar. 11, 2024 in Application No. 20923562.1.

International Search Report of PCT/KR2020/015457 dated Feb. 15, 2021 [PCT/ISA/210].

* cited by examiner

HEIGHT-ADJUSTABLE SPINAL FUSION CAGE

CROSS REFERENCE TO RELATED APPLICATIONS

This application is a National Stage of International Application No. PCT/KR2020/015457 filed on Nov. 6, 2020, claiming priority based on Korean Patent Application No. 10-2020-0028480 filed on Mar. 6, 2020.

TECHNICAL FIELD

The present invention relates to a height-adjustable spinal fusion cage. More specifically, the present invention relates to a height-adjustable spinal fusion cage which is inserted between vertebral bodies in a state where the cage has the lowest height, is height-adjustable in the inserted state, and particularly can simplify a height adjustment mechanism.

BACKGROUND ART

The vertebral body includes 32 to 35 vertebrae and intervertebral disks, which are simply called disks, between the vertebrae, and is the central part of the body that connects the skull at the top and the pelvis at the bottom.

The vertebra is composed of 7 cervical vertebrae, 12 thoracic vertebrae, 5 lumbar vertebrae, 5 sacral vertebrae (sacrum), and 3 to 5 coccygeal vertebrae (coccyx). In adults, the five sacral vertebrae fuse into one sacrum, and the three to five coccygeal vertebrae fuse into one coccyx.

Spinal fusion is a method of treating serious spinal diseases that last for a long time. In spinal fusion surgery, an intervertebral disk is removed, and a cage is inserted as a substitute between adjacent vertebral bodies to join the adjacent vertebral bodies together.

The spinal fusion methods for the lumbar spine may be classified, depending on the insertion direction of a cage, into posterior lumbar interbody fusion (PLIF), Transforaminal lumbar interbody fusion (TLIF), lateral lumbar interbody fusion (LLIF), oblique lumbar interbody fusion (OLIF), anterior lumbar interbody fusion (ALIF), etc.

Posterior lumbar interbody fusion (PLIF) is a method of making an incision along the midline of the lumbar spine to entirely expose a vertebra, removing a posterior portion of the vertebra, removing a disk, and inserting PLIF cages.

Posterior lumbar interbody fusion (PLIF) is the oldest method among lumbar interbody fusion methods, and is necessary when fusing two or three vertebrae together. However, posterior lumbar interbody fusion (PLIF) has disadvantages such as a high possibility of adhesions at the nerves, ligaments, and muscles due to surgical procedures, a long recovery time due to a large incision area, and serious sequelae in some patients.

PLIF cages, a pair of small cages configured to be arranged at the left and right sides, are smallest among all the cages used for spinal fusion.

Transforaminal lumbar interbody fusion (TLIF) is a surgical method in which small incisions are made along both sides of a spine muscle to minimally expose the body of a vertebra, and then while removing a portion of the vertebra to expose a neural foramen, a TLIF cage is inserted instead of a disk. This surgical technique is advantageous in terms of less bleeding and a short operation time and is suitable for one joint, but PLIF is required when treating multiple sites. Most TLIF cages are arc shaped, and thus the convex portion of a TLIF cage is oriented toward the abdomen by inserting and rotating the TLIF cage between vertebral bodies. TLIF cages are larger than PLIF cages, but the supporting areas of TLIF cages are smaller than those is of LLIF cages or ALIF cages, which will be mentioned later.

Anterior lumbar interbody fusion (ALIF) has several advantages, such as quick recovery from surgery and a low possibility of adhesions. However, ALIF requires a highly advanced skill in making an incision in the anterior (abdomen) and accessing the spine while dislodging the internal organs. ALIF cages have an advantage of having the largest support areas among all interbody fusion cages.

As such an ALIF cage, a self-supporting cage (integrated cage) having holes through which screws can be inserted and fixed to vertebral bodies to prevent separation of the cage after surgery is disclosed (US 2014-0277487A).

In addition, U.S. Pat. No. 9,585,762 and US2019-0133782A disclose height-adjustable, self-supporting ALIF cages. In U.S. Pat. No. 9,585,762, a vertical ratchet 302 is used for height adjustment, and angle adjustment is substantially performed instead of height adjustment. US2019-0133782A discloses height adjustment but has problems such as a very complicated structure and difficulty in manufacturing.

The cage for the cervical vertebrae is inserted only by ACIF. Since the ACIF cage has a considerably low height, it is not easy to implement height adjustment compared to the ALIF, and U.S. Ser. No. 10/034,767, which can also be used as an ACIF cage, has been disclosed. However, in U.S. Ser. No. 10/034,767, the surroundings are closed by the wall which is disadvantageous for supplying bone grafts.

Additionally, in the case of height-adjustable cages as above, there is a risk of damage to the vertebrae when an excessive force is applied because the adjacent vertebrae are forcibly extended and positioned. Therefore, in order to solve this problem, a torque limit handle is connected to the screwdriver used when extending the vertebral bodies, so that it can be used only within a predetermined torque range. However, the torque limit handle has a complex structure and is heavy.

If surgical tools are complicated, when they are re-used after cleaning and sterilization, there is a possibility that the cleaning and sterilization may be incomplete. Additionally, if the tools are heavy, it is not only inconvenient for a doctor to hold the surgical tools, but also the weight of the container for storing the surgical tools increases, which may be a burden during transportation.

PRIOR ART REFERENCE

Patent Document (Patent Document 1) U.S. Pat. No. 9,585,762
(Patent Document 2) US2019-0133782A
(Patent Document 3) US2014-0277487A
(Patent Document 4) U.S. Ser. No. 10/034,767

DETAILED DESCRIPTION OF INVENTION

Technical Task

An object of the present invention derived for solving the above-mentioned problems is to provide a spinal fusion cage which is inserted between vertebral bodies in a state where the cage has the lowest height, is height-adjustable in the inserted state, can stably support the movement of a pair of end plates, and particularly can simplify a height adjustment mechanism.

Means for Solving Technical Task

In order to achieve the above object, the present invention provides spinal fusion cage, comprising: a first end plate and a second end plate which are in contact with adjacent vertebral bodies; a distal movable block fixed to be movable relative to plate slope portions formed on one end of the first end plate and one end of the second end plate; a proximal movable block fixed to be movable relative to plate slope portions formed on another end of the first end plate and another end of the second end plate; an adjustment member rotatably fixed to the proximal movable block and screwed to the distal movable block to adjust a distance between the distal movable block and the proximal movable block; a first guide portion formed on the first end plate toward the second end plate; and a second guide portion formed on the second end plate toward the first end plate to limit, by sliding with the first guide portion, a movement direction in which the first end plate and the second end plate are moved close to or away from each other, wherein the first guide portion and the second guide portion support a load in the length or width direction of the first end plate and the second end plate, and a removable portion connected by a connection portion which is disconnected when a predetermined torque is applied to an end portion in the proximal direction of the adjustment member is arranged.

The cage further comprises a bone screw inserted into bone screw holes formed on the first end plate and the second end plate.

A block slider is formed on the distal movable block and the proximal movable block, and a plate slider slidable with respect to the block slider is formed on the plate slope portion.

The adjustment member comprises a threaded portion formed on an end thereof and screwed to the distal movable block, and an adjustment member support surface formed on another end thereof and rotatable at a given position with respect to the proximal movable block.

The proximal movement block comprises an inner fastening portion spaced apart from an outer surface of the adjustment member in the proximal direction compared to the adjustment member support surface.

An outer fastening portion is formed on an outer surface of the proximal movable block.

The proximal movable block comprises an inner fastening portion spaced apart from an outer surface of the adjustment member in the proximal direction compared to the adjustment member support surface, and an outer fastening portion formed on an outer surface of the proximal movable block.

A first tool fastening portion binding to a tool is formed on an outer surface of the removable portion.

A second tool fastening portion is formed on an outer surface of an adjustment member head which is formed at one side of the adjustment member in the proximal direction so as to bind to the tool.

The first tool fastening portion and the second tool fastening portion have the same cross sections.

The inside of the removable portion is penetrated.

The connection portion is arranged along a proximal edge of the adjustment member head, and the connection portion consists of at least two connection units.

The connection unit comprises a notch in an inner circumferential side or an outer circumferential side of the adjustment member head.

The first guide portion comprises a pillar protruding toward the second end plate, and the second guide portion comprises an extension wall protruding toward the first end plate so as to be slidable with respect to the pillar.

An accommodation portion is formed around the pillar to receive the extension wall when the first end plate and the second end plate approach.

A guide recess is formed on the extension wall to guide the insertion of the pillar.

An anchor portion having no screw thread is formed on a distal end portion of the bone screw.

The anchor portion includes an anchor groove extending in the length direction of the bone screw.

Effect of Invention

According to the present invention, cages having heights within a given range can be replaced with one cage. Therefore, manufacturers may reduce the number of product groups and the amount of inventory. Additionally, since the height of the cage is linearly adjustable according to the distance between the vertebral bodies of patients unlike conventional cages having heights preset at predetermined intervals, surgery may be performed at an optimal height according to the conditions of patients.

Also, since the cage is inserted at the lowest height, the burden of separately producing test inserts according to the existing proper intervertebral spacing may be reduced, and the effort of securing an insertion space while inserting a plurality of test inserts sequentially may be reduced from the doctor's point of view.

Furthermore, the height adjustment mechanism can be simplified through the adjustment member which gives way when a predetermined torque is applied.

BEST MODE FOR CARRYING OUT THE INVENTION

Figure 1:
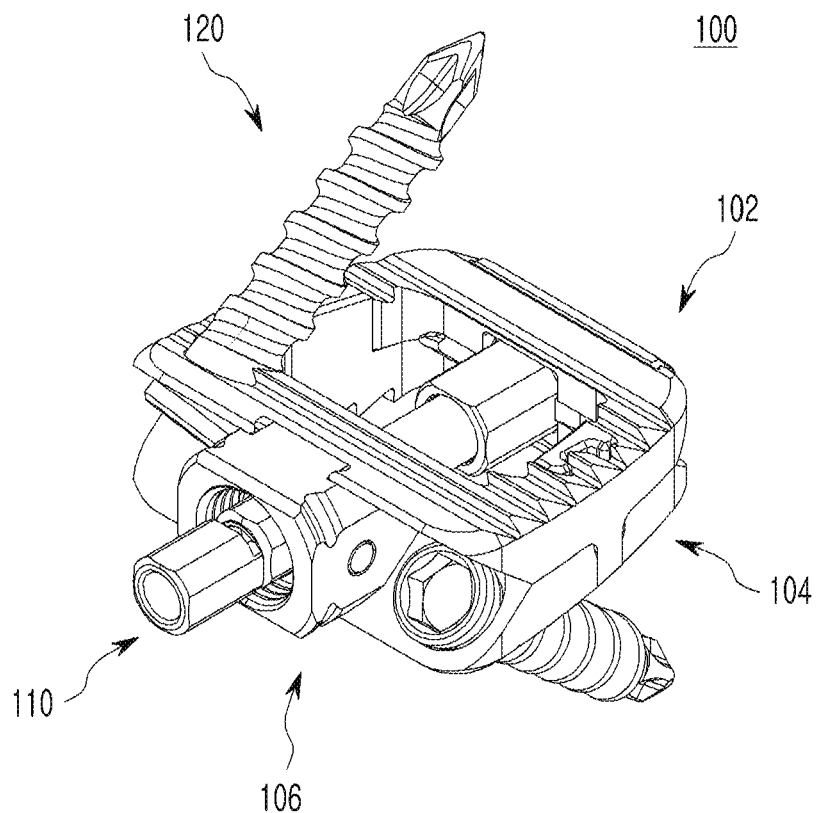
FIG. 1 is an upper-front perspective view illustrating a spinal fusion cage in a lowest state according to an embodiment of the present invention.
Figure 2:
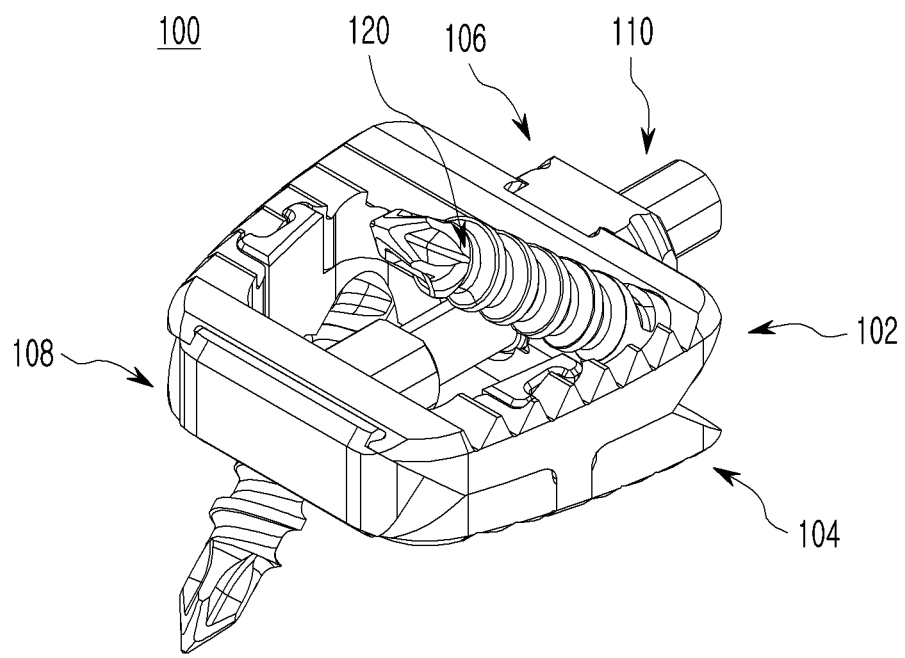
FIG. 2 is an upper-rear perspective view illustrating the spinal fusion cage of FIG. 1 in a lowest state.
Figure 3:
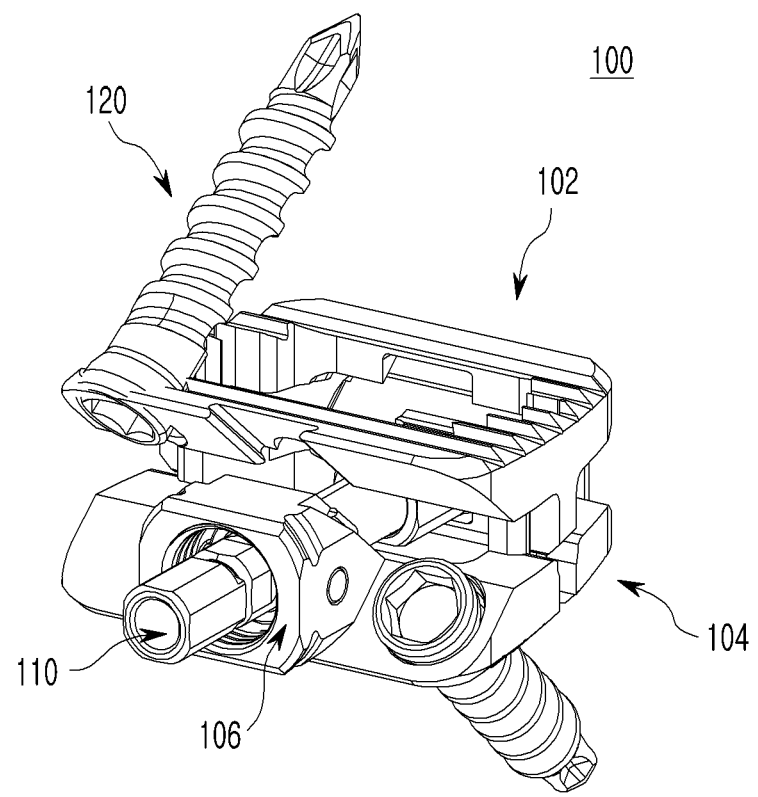
FIG. 3 is an upper-front perspective view illustrating the spinal fusion cage of FIG. 1 in a highest state.
Figure 4:
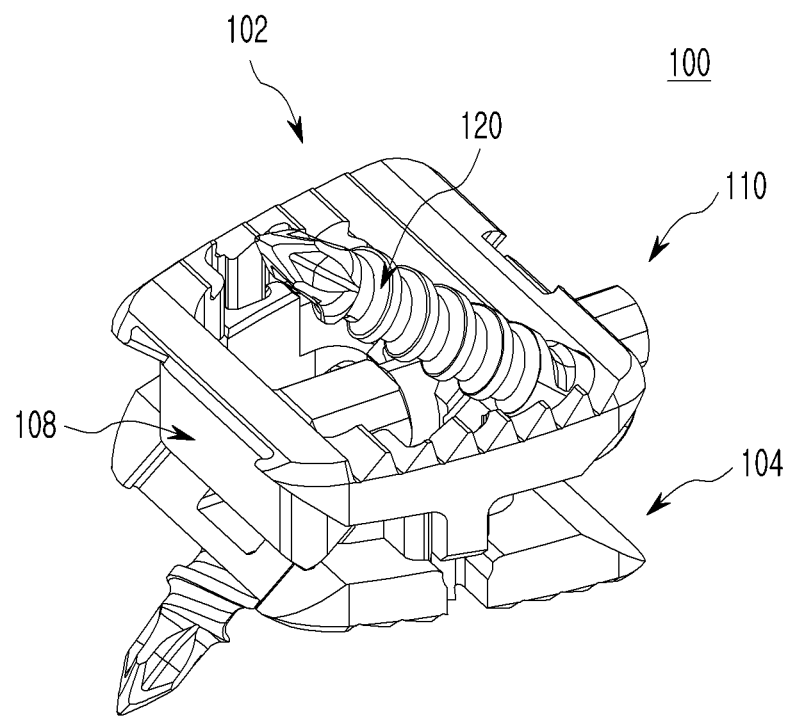
FIG. 4 is an upper-rear perspective view illustrating the spinal fusion cage of FIG. 1 in the highest state.
Figure 5:
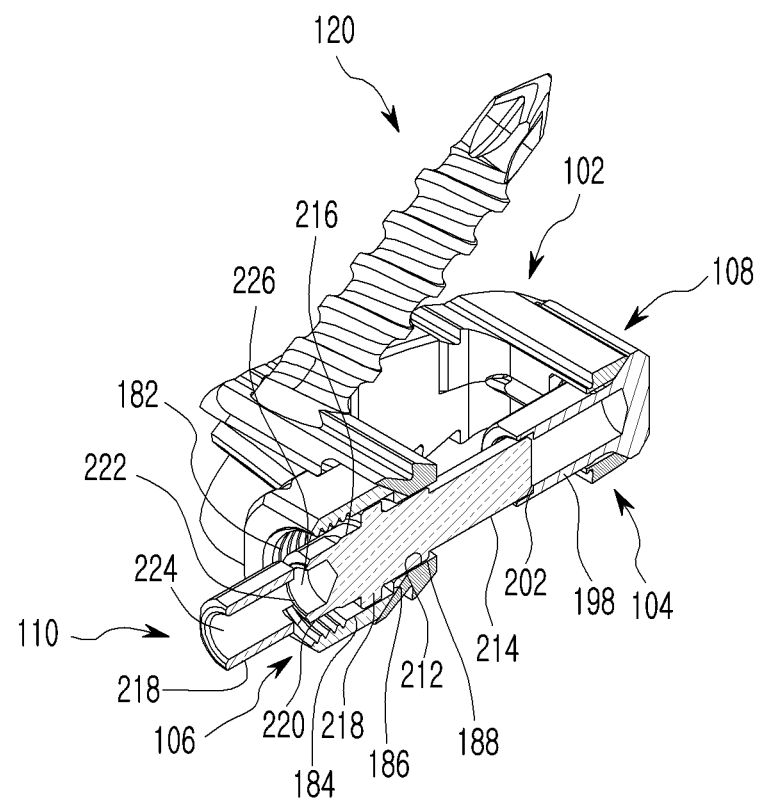
FIG. 5 is an upper-front cross-sectional perspective view illustrating the spinal fusion cage of FIG. 1 by vertically cutting along the front and rear direction.
Figure 6:
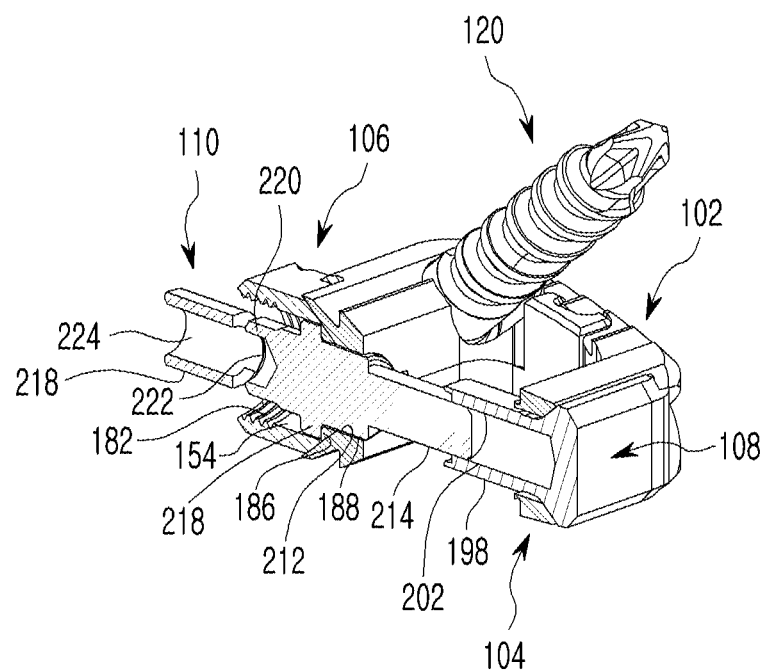
FIG. 6 is an upper-rear cross-sectional perspective view illustrating the spinal fusion cage of FIG. 1 by vertically cutting along the front and rear direction.
Figure 7:
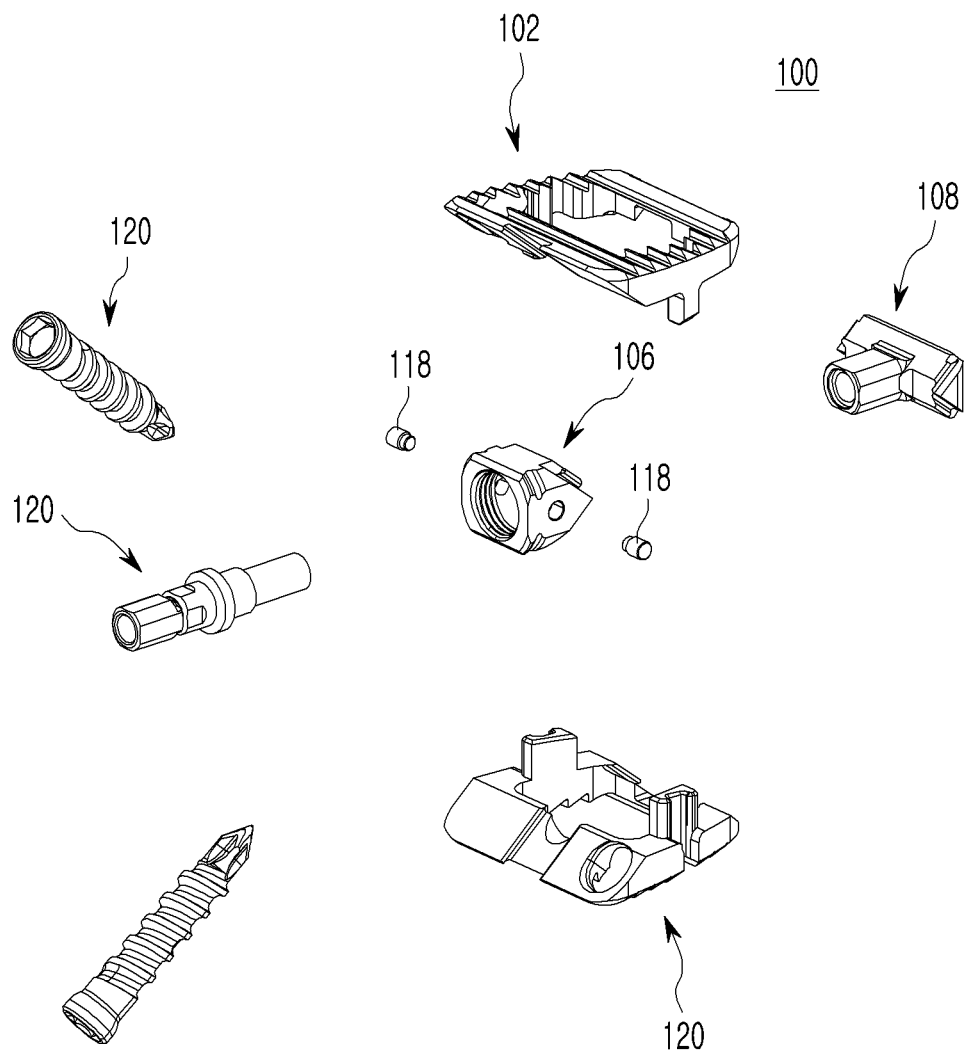
FIG. 7 is a front exploded perspective view illustrating the spinal fusion cage of FIG. 1.
Figure 8:
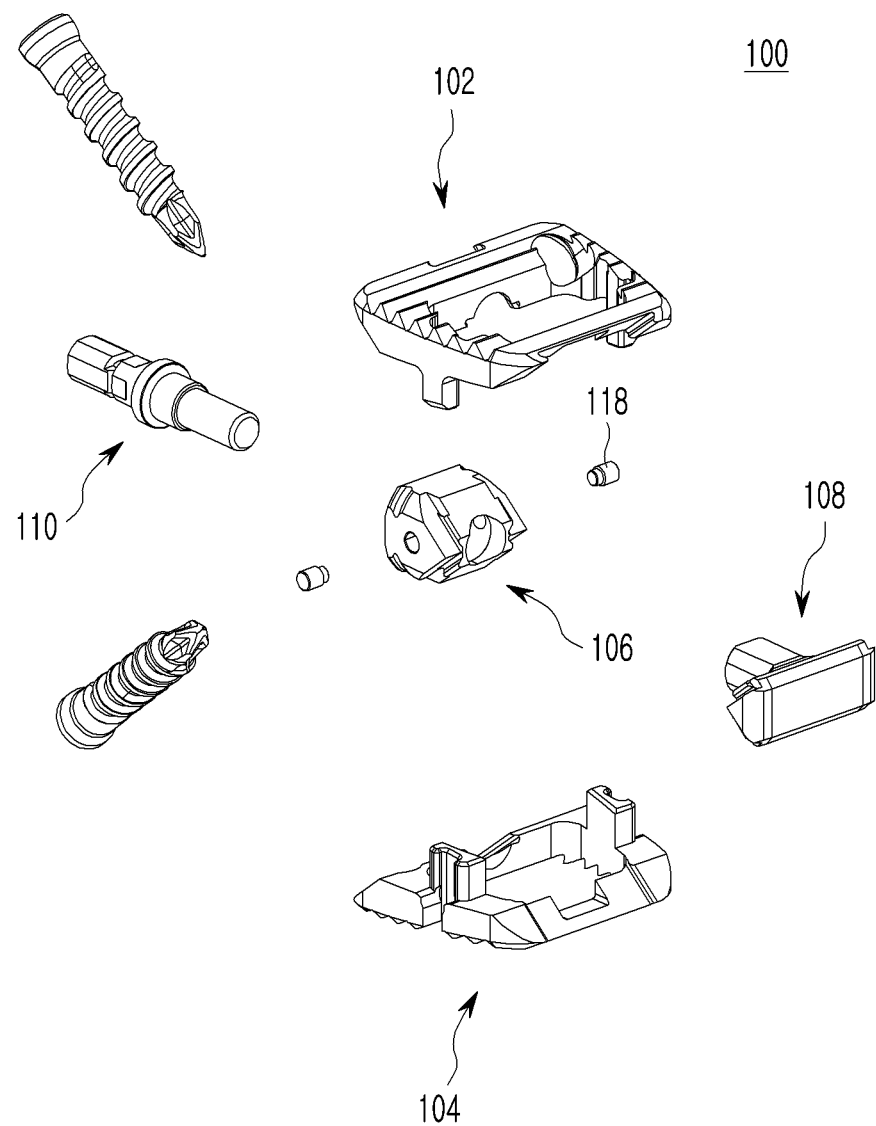
FIG. 8 is a rear exploded perspective view illustrating the spinal fusion cage of FIG. 1.

Hereinafter, preferred embodiments of the present disclosure will be described with reference to the accompanying drawings. In the drawings, the same elements may be denoted with the same reference numerals even though the elements are shown in different drawings, and detailed descriptions related to well-known functions or configurations will be ruled out in order not to unnecessarily obscure subject matters of the present disclosure.

Hereinafter, a distal end direction means a direction into which the cage is inserted, and a proximal direction means a direction opposite to the distal end direction.

FIGS. 1 to 8 entirely illustrate a spinal fusion cage 100 according to embodiments, and FIGS. 9 to 21 illustrate each element of the spinal fusion cage 100.

The spinal fusion cage 100 generally includes a first end plate 102 and a second end plate 104 which face each other in a vertical direction, a distal movable block 108 and a proximal movable block 106 which are arranged between the first end plate 102 and the second end plate 104 to move along the distance between the first end plate 102 and the second end plate 104, and an adjustment member 110 which is connected to the distal movable block 108 through the proximal movable block 106.

The first end plate 102 and the second end plate 104 include a first plate body 104 and a second plate body 146 which have tooth-shaped protrusions on surfaces to be brought into contact with vertebral bodies. The tooth-shaped protrusions are formed to prevent separation from vertebral bodies and may be variously modified. Additionally, a first window 144 and a second window 172 may be respectively formed in a center portion of the first plate body 104 and a center portion of the second plate body 146 such that a bone graft may be inserted therethrough.

Figure 9:
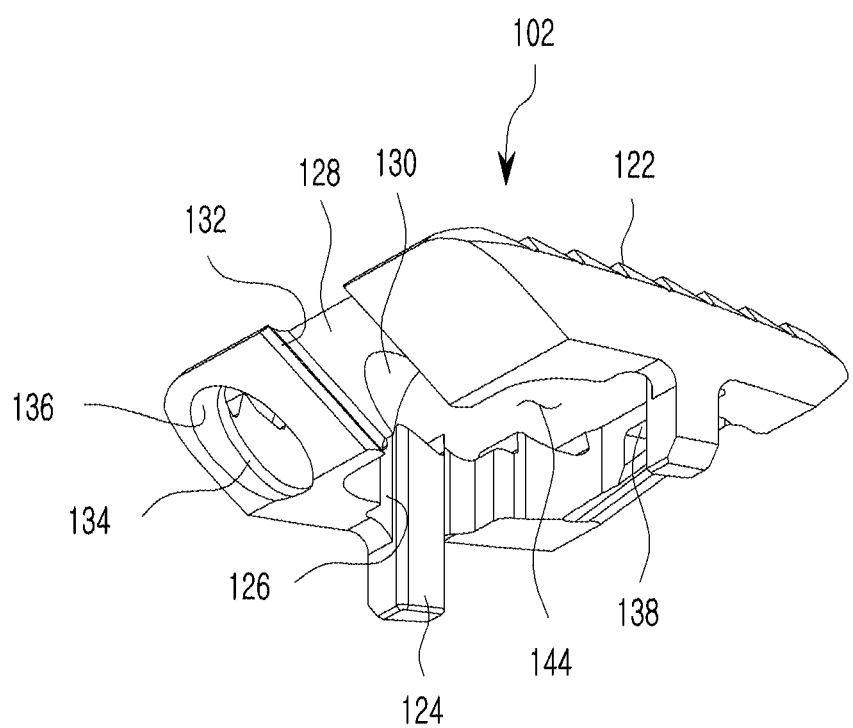
FIG. 9 is a lower-front perspective view illustrating a first end plate of the spinal fusion cage of FIG. 1.
Figure 10:
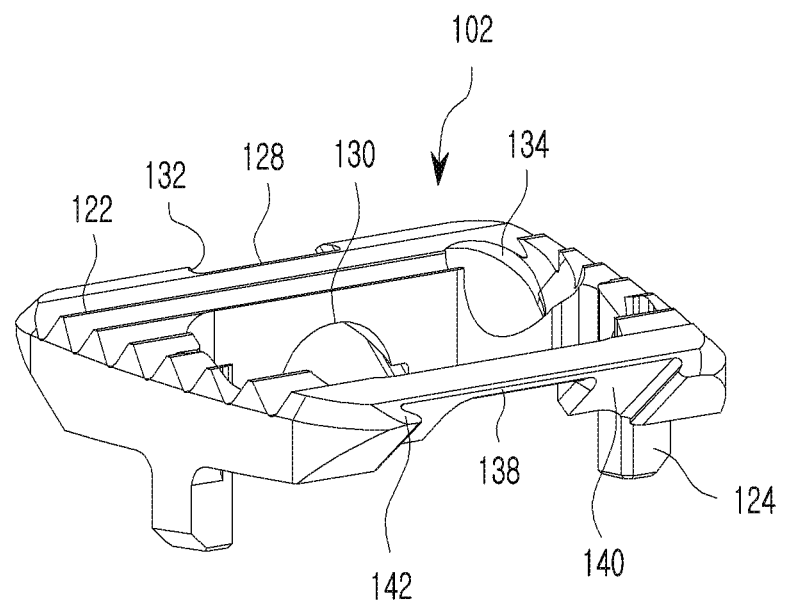
FIG. 10 is an upper-rear perspective view illustrating the first end plate of the spinal fusion cage of FIG. 1.

Additionally, as illustrated in FIGS. 9 and 10, a proximal movable block seat 130 is formed along the length direction of the first plate body 122 in the proximal direction, and a distal movable block seat 138 is formed in the distal direction. A plate slope portion 128 is formed by extending from the proximal movable block seat 130, and a pair of plate sliders 132 facing each other are formed on both sides of the plate slope portion 128. Additionally, a bone screw hole 134 is formed on an outer side of the plate slider 132. The bone screw hole 134 is penetrated so that the bone screw 120 may be inserted, and a guide surface 136 for guiding the bone screw 120 may be formed on an entrance side of the bone screw hole 134. Also, a plate slope portion 140 is formed around the distal movable block seat 138. The plate slope portion 140 is formed on both ends of the distal movable block seat 138, and plates sliders 142 are respectively formed on outer sides of the plate slope portion 140. The plate slider 132 formed on the proximal portion and the plate slider 142 formed on the distal end portion are formed to be sloped in a manner approaching the center of the first plate body 122 as they go away from a surface of the first plate body 122 in the thickness direction.

Figure 11:
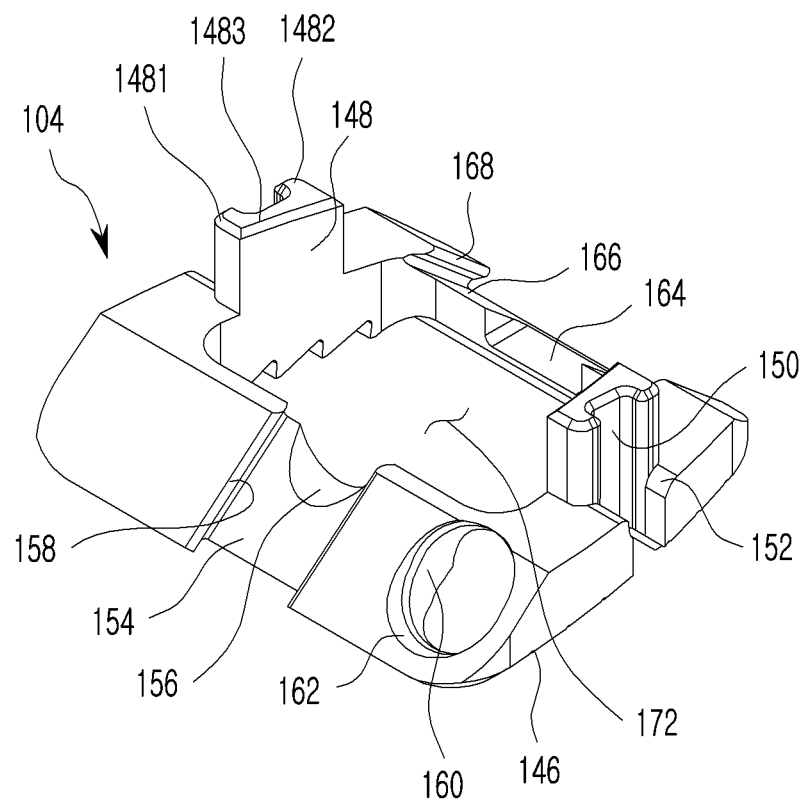
FIG. 11 is an upper-front perspective view illustrating a second end plate of the spinal fusion cage of FIG. 1.
Figure 12:
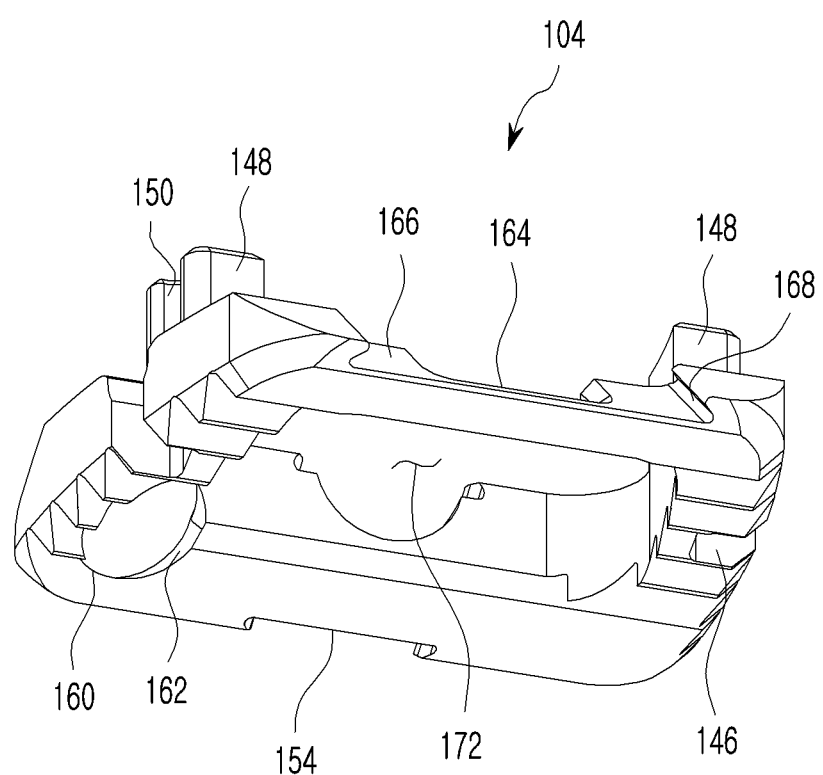
FIG. 12 is a lower-rear perspective view illustrating the second end plate of the spinal fusion cage of FIG. 1.

Similarly, as illustrated in FIGS. 11 and 12, a proximal movable block seat 156 is formed along the length direction of the second plate body 146 in the proximal direction, and a distal movable block seat 164 is formed in the distal direction. A plate slope portion 154 is formed by extending from the proximal movable block seat 156, and a pair of plate sliders 158 facing each other are formed on both sides of the plate slope portion 154. Additionally, a bone screw hole 160 is formed on an outer side of the plate slider 158. The bone screw hole 160 is penetrated so that the bone screw 120 may be inserted, and a guide surface 162 for guiding the bone screw 120 may be formed on an entrance side of the bone screw hole 160. Also, a plate slope portion 166 is formed around the distal movable block seat 164. The plate slope portion 166 is formed on both ends of the distal movable block seat 164, and plates sliders 168 are respectively formed on outer sides of the plate slope portion 166. The plate slider 158 formed on the proximal portion and the plate slider 168 formed on the distal end portion are formed to be sloped in a manner of approaching the center of the second plate body 146 as they go away from a surface of the second plate body 146 in the thickness direction.

Figure 13:
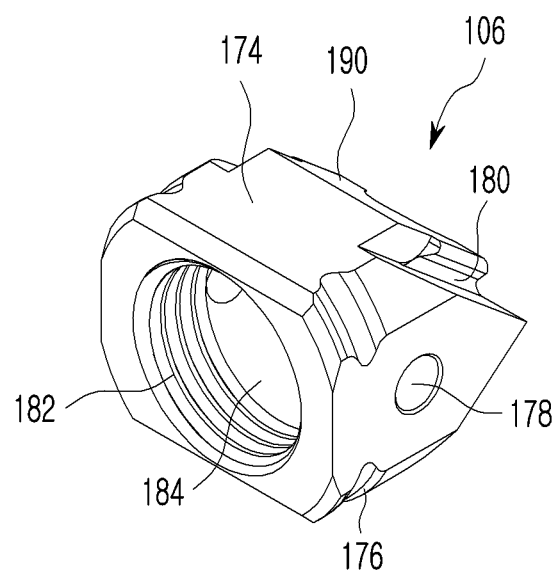
FIG. 13 is an upper-front perspective view illustrating a proximal movable block of the spinal fusion cage of FIG. 1.
Figure 14:
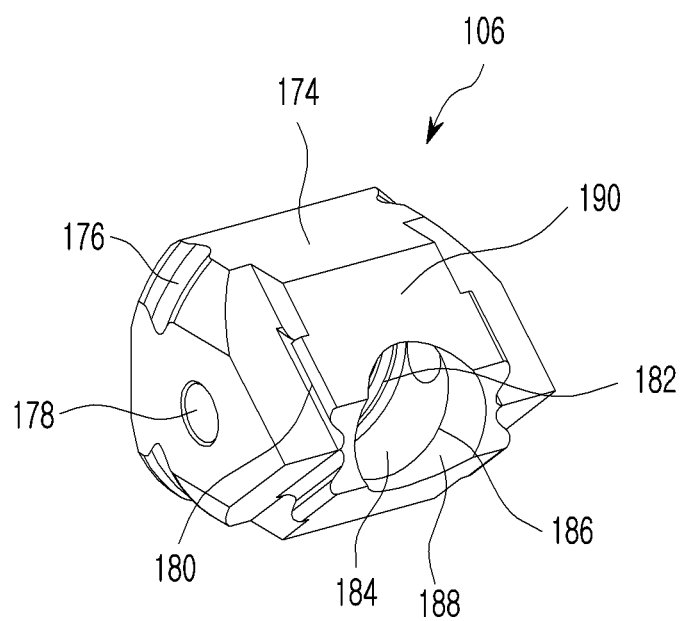
FIG. 14 is an upper-rear perspective view illustrating the proximal movable block of the spinal fusion cage of FIG. 1.

With respect to the proximal movable block 106, as illustrated in FIGS. 13 and 14, a block slope portion 190 is formed on the proximal side around a proximal connection tube body 190 having an adjustment member hole 188 into which the adjustment member 110 is inserted and supported. Block sliders 180 which are slidably coupled to the plate sliders 132, 158 formed on the first and second end plates 102, 104 are arranged on both sides of the block slope portion 190. The adjustment member hole 184 includes a support portion 184 which is to be in contact with the adjustment member 110 for supporting the adjustment member, and a support jaw 186 formed around the support portion 184 for preventing separation of the adjustment member 110. Additionally, a pinhole 178 capable of installing a pin member 118 is formed on a lateral portion of the proximal movable block 106 in order to prevent the adjustment member 110 located in the support portion 184 from being separated to the proximal side. Also, an outer fastening portion 176 is formed on a lateral portion of the proximal movable block 106 so that the tool can fix the spinal fusion cage 100. The outer fastening portion 176 may be formed with protrusions or screw threads, etc., and may be used to be coupled with tools or other implants such as plates. Furthermore, an inner fastening portion 182 may be formed on the inner side of the outer fastening portion 176 around the adjustment member 110. The inner fastening portion 182 may have screw threads, and may be used to be coupled with tools or other implants such as plates.

Figure 15:
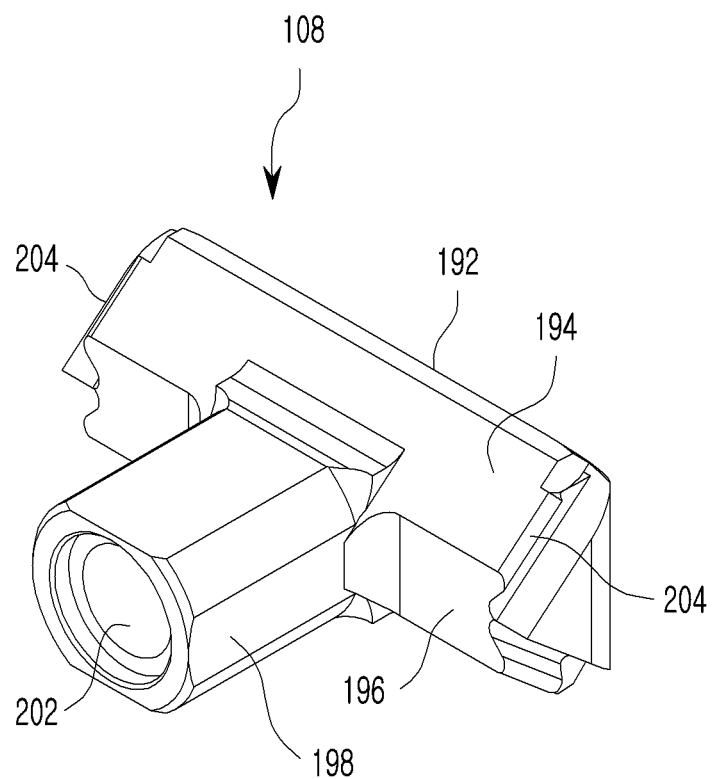
FIG. 15 is an upper-front perspective view illustrating a distal movable block of the spinal fusion cage of FIG. 1.
Figure 16:
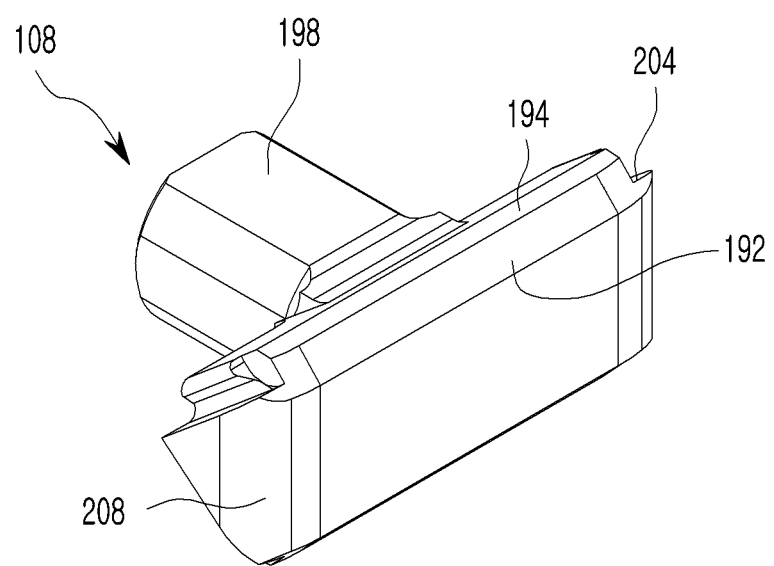
FIG. 16 is an upper-rear perspective view illustrating the distal movable block of the spinal fusion cage of FIG. 1.

With respect to the distal movable block 108, as illustrated in FIGS. 15 and 16, a distal connection tube body 198 having a movable block thread portion 202 which is screwed with the adjustment member 110 is formed on a center portion of the distal movable block 108, and a wing portion 196 is provided on both sides of the distal connection tube body 198. A block slope portion 194 is formed on the wing portion 196, and a block slider 204 is arranged on both sides of the wing portion 196. The block slider 204 is slidably coupled to the plate sliders 142, 168 of the first and second end plates 102, 104, respectively.

The distal movable block 108 has a distal wall 192 for ease of insertion between the vertebral bodies in the distal direction, and the distal wall 192 is formed in one piece with the block slope portion 194. Additionally, in a lowest state, the distal wall 192 is in contact with an end portion of the first end plate 102 and an end portion of the second end plate 104 to form one insertion portion as a whole. In particular, a distal bent surface 208 is formed on both sides of the distal wall 192 to facilitate the insertion.

The distal movable block 108 and the proximal movable block 106 have a substantially wedge-shaped structure, and are configured to push or support the first end plate 102 and the second end plate 104 to lift or lower the same.

Figure 17:
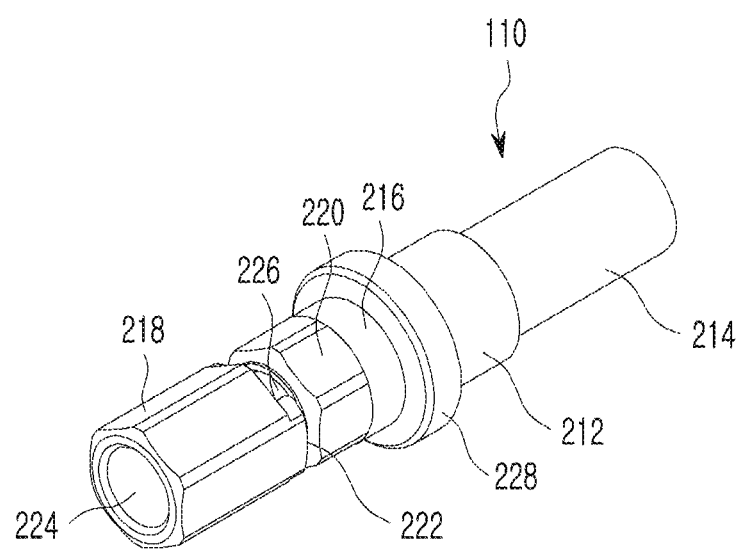
FIG. 17 is an upper-front perspective view illustrating an adjustment member of the spinal fusion cage of FIG. 1.
Figure 18:
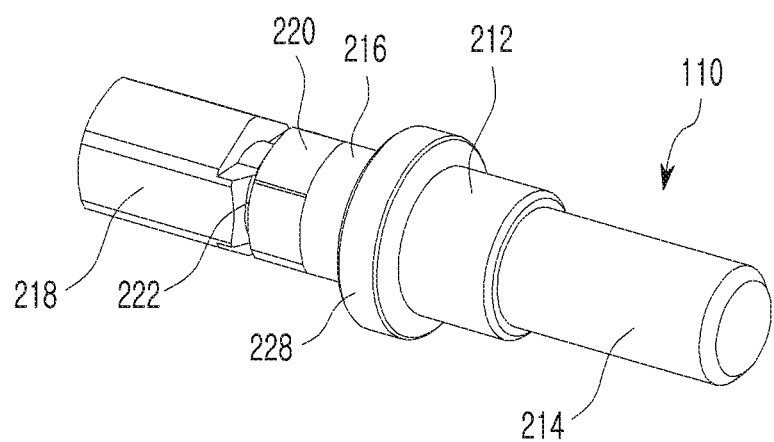
FIG. 18 is an upper-rear perspective view illustrating the adjustment member of the spinal fusion cage of FIG. 1.
Figure 19:
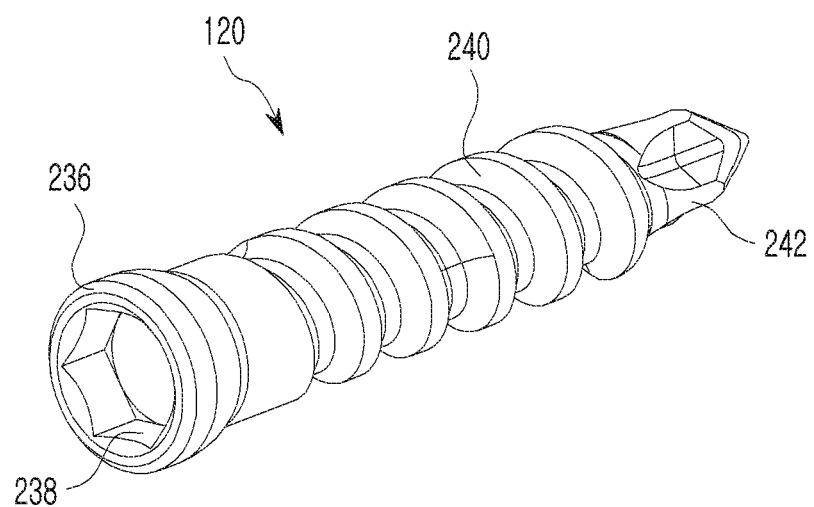
FIG. 19 illustrates a bone screw used in the spinal fusion cage of FIG. 1.
Figure 20:
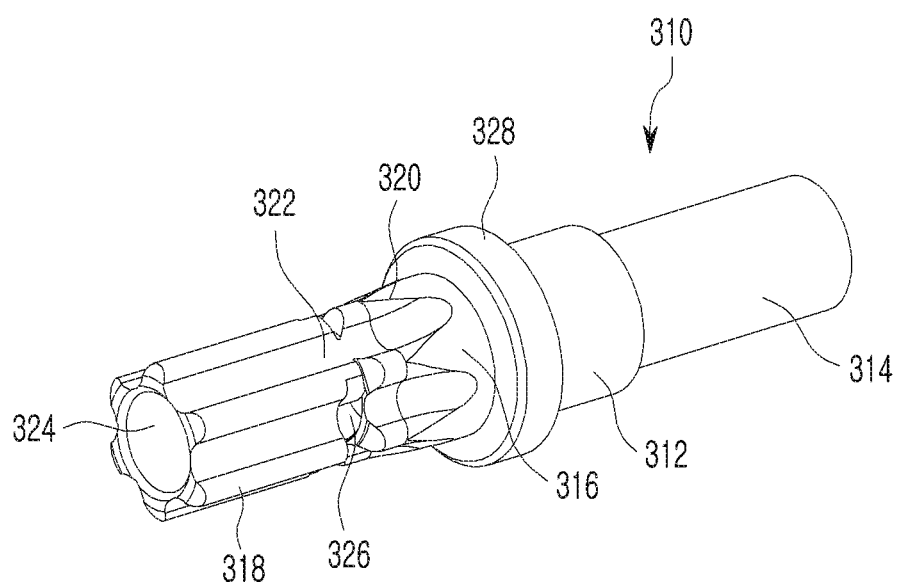
FIG. 20 is a first modified embodiment of the adjustment member used in the spinal fusion cage of FIG. 1.
Figure 21:
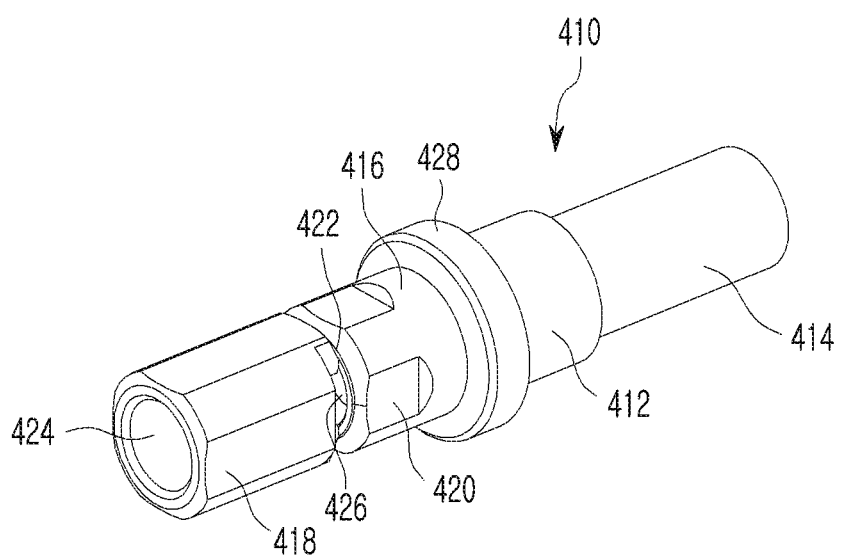
FIG. 21 is a second modified embodiment of the adjustment member used in the spinal fusion cage of FIG. 1.

As illustrated in FIGS. 17 and 18, the adjustment member 110 may have a substantially bolt shape. Additionally, FIGS. 20 and 21 illustrate adjustment members 310, 410 according to modified embodiments. Hereinafter, the above three adjustment members 110, 310, 410 will be explained at one go, and only the characteristics of each will be described. The adjustment members 110, 310, 410 include adjustment member heads 220, 320, 420, adjustment thread portions 214, 314, 414 which are integrally connected to the adjustment member heads 220, 320, 420 to the distal side and screwed to the movable block thread portion 202 of the distal movable block 108, and removable portions 218, 318, 418 which are connected to the adjustment member heads 220, 320, 420 in the proximal direction through connection portions 222, 322, 422.

An adjustment member support surface 212 may be formed between the adjustment member heads 220, 320, 420 and the adjustment thread portions 214, 314, 414. Pin support portions 228, 328, 428 are formed to the proximal side of the adjustment member support surfaces 212, 312, 412, and pin seats 216, 316, 416 in which the end portion of the pin member 118 is located are formed to the proximal side of the pin support portions 228, 328, 428. Therefore, the adjustment members 110, 310, 410 rotate while the adjustment member support surfaces 212, 312, 412 contact the support portion 188, in a state where the pin support portions 228, 328, 428 are supported by the support jaw 186 of the proximal movable block 106. As a result, the adjustment member 110 can rotate at a given position inside the adjustment member 110.

The adjustment member heads 220, 320, 420 are formed on the proximal side of the adjustment members 110, 310, 410, and removable portions 218, 318, 418 are connected to the proximal side of the adjustment member heads 220, 320, 420 by the connection portions 222, 322, 422.

A first tool fastening portion binding to a tool may be formed on an outer surface of the removable portions 218, 318, 418. Additionally, as illustrated in FIGS. 17 and 18, the first tool fastening portion may be formed in a hexagonal shape, or in a star shape or a rectangular shape as illustrated in FIGS. 20 and 21, but is not limited thereto, and various modifications can be made.

Similarly, a second tool fastening portion may be formed on an outer surface of the adjustment member heads 220, 320, 420 so as to bind to a tool. The second tool fastening portion may be formed in a hexagonal shape as illustrated in FIGS. 17 and 18, or in a star shape or a rectangular shape as illustrated in FIGS. 20 and 21, but is not limited thereto, and various modifications can be made.

In particular, the cross sections of the first tool fastening portion and the second tool fastening portion may be formed to be the same. In this case, there are a lot of advantages. First, when a groove corresponding to the first and second tool fastening portions is elongated in one screwdriver (not illustrated), the screwdriver may be pushed to the end, thereby contacting the removable portions 218, 318, 418 and the adjustment member heads 220, 320, 420 at the same time. In this case, the removable portions 218, 318, 418 can deliver a torque without being cut, and thus can be utilized when a doctor determines to be necessary. Also, when the screwdriver selectively rotates in a state inserted only in the removable portions 218, 318, 418, it is possible to separate the removable portions 218, 318, 418 from the adjustment member heads 220, 320, 420. Furthermore, even when the spinal fusion cage 100 is seated on the patient's body with a screwdriver and then replaced with another product later, it is possible to rotate the adjustment member heads 220, 320, 420 with the same screwdriver. Thus, it is very cost-effective in preparing the tool.

In order to increase the role of the screwdriver, grooves such as a straight groove or a cross groove may be processed at the end side of the proximal portion of the removable portions 218, 318, 418 to replace or supplement the first tool fastening portion.

In addition, the inside of the removable portions 218, 318, 418 is penetrated, and thus may communicate with opening grooves 226, 326, 426 formed on the adjustment member heads 220, 320, 420. The opening grooves 226, 326, 426 may have a screwdriver tip shape. In this case, through holes 224, 324, 424 may adjust the position of the adjustment members 110, 310, 410 using the opening grooves 226, 326, 426 when the removable portions 218, 318, 418 are still formed in one piece.

The connection portions 222, 322, 422 are arranged along the proximal edge of the adjustment member heads 220, 320, 420, and the connection portions 222, 322, 422 may consist of at least two connection units. The adjustment member heads 220, 320, 420 and the removable portions 218, 318, 418 may be spaced apart from each other with a gap by the connection unit. The connection unit may have a notch in the inner circumferential side or outer circumferential side of the adjustment member heads 220, 320, 420. Therefore, it is possible for the designer to set a required limit torque value based on the number of the connection units, the circumferential length and radial thickness of the connection unit, and the size of the notch. Accordingly, since the limit torque value of the connection portions 222, 322, 422 may perform the function of a torque limit handle used in the prior art, the torque limit handle may be omitted in the screwdriver required for rotating the adjustment members 110, 310, 410. Thus, the tools may be made simpler and lighter. In particular, when the torque limit handle is used for a long time, the set value changes and thus periodic correction or replacement is required. However, in the spinal fusion cage 100 according to the present invention, when a product is produced according to a quality procedure through a certain process in a factory, since the limit torque value of the connection portions 222, 322, 422 becomes constant within the allowable limits of error, the product may have a certain limit torque value even when the time elapses.

Since the shape of the removable portion 218 in FIGS. 17 and 18 is a hexagon, a screwdriver such as an Allen wrench may be used. Since the shape of the removable portion 318 in FIG. 20 is a star, a star-shaped screwdriver may be used. Additionally, other modifications can be made, such as a removable portion 418 having a rectangular cross-section in FIG. 21.

A pair of pillars 124 are formed on both sides of the first plate body 122 in the thickness direction, that is, in the direction toward the second end plate 104. Additionally, an accommodation portion 126 for receiving an extension wall 148 which will be mentioned later is formed around the pillar 124. Also, the extension wall 148 is formed on both sides of the second plate body 146 in the thickness direction, that is, in the direction toward the first end plate 102, and a groove 150 for guiding the pillar 124 to be received is formed on an inner side of the extension wall 148. Therefore, as the pillar 124 is received inside the groove 150 and moves vertically, the first end plate 102 and the second end plate 104 moves toward or away from each other in a restricted state. Here, the pillar 124 and the extension wall 148 correspond to a first guide portion and a second guide portion. The first guide portion and the second guide portion have a function of supporting a load or torsion in the length or width direction of the first end plate 102 and the second end plate 104.

When viewed from the top, the extension wall 148 has a substantially U-shape to surround the pillar 124. More specifically, the extension wall 148 includes a first wall 1481 located in the proximal direction, a second wall 1482 located in the distal direction, and a third wall 1483 which connects the first wall 1481 and the second wall 1482. When viewed having the groove 150 as the center, the first wall 1481 and the second wall 1482 are located at a bottom surface (opposite surface of the surface facing the vertebral bodies) of the first and second end plates 102, 104 so as to maintain the width of the groove 150 as it is. Additionally, the third wall 1483 is formed to maintain the depth of the groove 150 in the direction opposite to the direction where the groove 150 is open. Therefore, the thickness in the length direction as well as the width direction of the pillar 124 can be increased. Therefore, the first wall 1481 and the second wall 1482 support the shear force in the length direction, and the third wall 1483 supports the shear force in the width direction. Accordingly, the strength of the shear force in the length and width direction may be dramatically increased.

The bone screw 120 used in the embodiments will be explained with reference to FIG. 20.

The bone screw 120 illustrated in FIG. 20 includes a screw head 236 which limits the entry amount of the bone screw 120 when it is inserted into the bone screw holes 134, 160, a tool seat 238 which is formed on the screw head 236 to be fastened to a tool, and a threaded portion 240 which is integrally formed with the screw head 236 and is inserted into the vertebral bodies. The threaded portion 240 may selectively use a double-lead thread and a single-lead thread so as to be suitable for the cancellous bones or cortical bones.

In particular, an anchor portion 242 is formed on the end portion of the threaded portion 240 inserted into the vertebral bodies. According to the prior art, when the bone screw is inserted into the bone, an additional tool such as an awl is required to set an initial direction. In particular, since the anchoring force of the screw is not great in the cancellous bone, the screw thread may often be meaningless in this area. Therefore, by forming a certain area on the distal end of the threaded portion 248 as the anchor portion 242, the bone screw 242 does not require a separate tool for setting an initial direction, and because insertion is carried out by hitting for a certain area, discomfort caused by rotating the screw may be reduced.

The anchor portion 242 has a nail-like shape in which only an end portion of a shank has a conical tip for the ease of insertion. Additionally, in the anchor portion 242, an anchor groove may be formed in the length direction of the bone screw 252. In this case, the contact area with the bone becomes larger, thereby increasing the anchoring force.

The spinal fusion cage 100 is configured as described above, and a surgery method using the spinal fusion cage 100 will now be described.

First, a surgical path to vertebral bodies is secured using surgical tools, and a disk is removed. Additionally, in a state where the spinal fusion cage 100 is held by a cage holder not illustrated, the spinal fusion cage 100 is inserted between the vertebral bodies from which the disk has been removed.

Thereafter, the proximal movable block 106 and the distal movable block 108 are moved close to each other by fastening the tools such as a screwdriver, etc. to the removable portions 218, 318, 418 of the adjustment member 110, and rotating the screwdriver in one direction, and thus the first end plate 102 and the second end plate 104 are moved apart from each other. In this case, when the torque of the screwdriver is greater than a predetermined torque determined by the connection portions 222, 322, 422, the connection portions 222, 322, 422 are destroyed, and thereby the removable portions 218, 318, 418 are separated from the adjustment member heads 220, 320, 420. Accordingly, it is possible to prevent the delivery of excessive load on the vertebral fusion cage 100 to the vertebral bodies.

Thereafter, the bone screw 120 is inserted into and fixed to the bone screw holes 134, 160 of the first end plate 102 and the second end plate 104. In this case, for the insertion of the bone screw 120, a hole is initially formed using a tool called an awl, and the hole is deepened with a drill through the pre-formed hole. Thereafter, a screw thread is formed to be slightly smaller than the bone screw 120 with a tool called a tapper to form a path for the screw thread to proceed, and then the bone screw 120 is inserted by rotating with a tool such as a screwdriver, etc. The formation of the screw thread by the tapper may be omitted. However, since an anchor portion 242 is formed on the end portion of the bone screw 120, tools such as an awl, a drill, a tapper, etc. are omitted when inserting the bone screw 120, and the direction setting and initial insertion of the bone screw 120 are performed by hitting with a tool such as a mallet, etc., and then the remaining threaded portion is inserted by rotating with a tool such as screwdriver, etc. Accordingly, the insertion process of the spinal fusion cage 100 is completed.

Similarly, when the spinal fusion cage 100 is incorrectly inserted or removed for reoperation, the bone screw 120 is rotated with a tool such as a screwdriver, etc. to be separated from the spinal fusion cage 100. The bone screw 120 having an anchor portion is pulled out with a pincer to be separated after being separated from the screw thread area.

Additionally, in a state where the spinal fusion cage 100 is held using a cage holder not illustrated, the proximal movable block 106 and the distal movable block 108 are moved away from each other by inserting a tool such as a screwdriver, etc. into the adjustment member 110 and reversely rotating the tool. Then, the first end plate 102 and the second end plate 104 are moved close to each other, and thus the entire height of the spinal fusion cage 100 is reduced, and the spinal fusion cage 100 is removed from the vertebral bodies.

While preferred embodiments of the present disclosure have been described as above, it will be understood by those of ordinary skill in the art that various changes in form and details may be made therein without departing from the spirit and scope of the present disclosure as defined by the following claims.

INDUSTRIAL APPLICABILITY

According to the present invention, one cage may be used for a given height range, thereby reducing the burden of inventory and production. Additionally, repetitive tasks during surgery are reduced, thereby reducing burdens on surgeons. In addition, the operation time and the amount of bleeding may be reduced, and thus the recovery time of patients may be greatly reduced. Therefore, the present disclosure may be widely used in related fields.

DESCRIPTION OF REFERENCE NUMERALS

100: spinal fusion cage
102: first end plate
104: second end plate
106: proximal movable block
108: distal movable block
110, 310, 410: adjustment member
118: pin member
120: bone screw
122: first plate body
124: pillar
126: accommodation groove
128, 140, 154, 166: plate slope portion
130, 156: proximal movable block seat
132, 142, 158, 168: plate slider
134, 160: bone screw hole
136, 162: guide surface
138, 164: distal movable block seat
144: first window
146: second plate body
148: extension wall
150: groove
152: guide portion
172: second window
174, 192: block body
176: outer fastening portion
178: pinhole
180, 204: block slider
182: inner fastening portion
184: adjustment member hole
186: support jaw
188: support portion
190, 194: block slope portion
192: distal wall
196: wing portion
198: distal connection tube body
202: movable block thread portion
208: distal bent surface
212, 312, 412: adjustment member support surface
214, 314, 414: adjustment thread portion
216, 316, 416: pin seat
218, 318, 418: removable portion
220, 320, 420: adjustment member head
222, 322, 422: connection portion
224, 324, 424: through hole
226, 326, 426: opening groove
228, 328, 428: pin support portion
236: screw head
238: tool seat
240: threaded portion
242: anchor portion
1481: first wall
1482: second wall
1483: third wall

What is claimed is:

1. A spinal fusion cage, comprising:
a first end plate and a second end plate which are configured to contact adjacent vertebral bodies;
a distal movable block fixed to be movable relative to plate slope portions formed on one end of the first end plate and one end of the second end plate;
a proximal movable block fixed to be movable relative to plate slope portions formed on another end of the first end plate and another end of the second end plate;
an adjustment member rotatably fixed to the proximal movable block and screwed to the distal movable block to adjust a distance between the distal movable block and the proximal movable block;
a first guide portion formed on the first end plate toward the second end plate; and
a second guide portion formed on the second end plate toward the first end plate to limit, by sliding with the first guide portion, a movement direction in which the first end plate and the second end plate are moved close to or away from each other,
a removable portion which is connected to the adjustment member via a connection portion, and is disconnected from the adjustment member when a predetermined torque is applied to an end portion of the adjustment member in a proximal direction,
wherein the first guide portion and the second guide portion support a load in the length or width direction of the first end plate and the second end plate.

2. The spinal fusion cage of claim 1, further comprising a first bone screw inserted through a first bone screw hole formed on the first end plate and a second bone screw inserted through a second bone screw hole formed on the second end plate.

3. The spinal fusion cage of claim 2, wherein an anchor portion having no screw thread is formed on a distal end portion of the bone screw.

4. The spinal fusion cage of claim 3, wherein the anchor portion comprises an anchor groove extending in the length direction of the bone screw.

5. The spinal fusion cage of claim 3, wherein the first guide portion includes a pillar formed on a side of the first end plate, and the second guide portion includes an extension wall formed on a side of the second end plate, the extension wall surrounding the pillar and including:
(i) a first wall positioned in a proximal direction,
(ii) a second wall positioned in a distal direction, and
(iii) a third wall connecting the first wall and the second wall,
wherein the first wall and the second wall are configured to support shear force in the length direction of the spinal fusion cage, and the third wall is configured to support shear force in the width direction of the spinal fusion cage.

6. The spinal fusion cage of claim 1, wherein a block slider is formed on each of the distal movable block and the proximal movable block, and a plate slider slidable with respect to the block slider is formed on the plate slope portion.

7. The spinal fusion cage of claim 1, wherein the adjustment member comprises a threaded portion formed on an end thereof and screwed to the distal movable block, and an adjustment member support surface formed on another end thereof and rotatable at a given position with respect to the proximal movable block.

8. The spinal fusion cage of claim 7, wherein the proximal movable block comprises an inner fastening portion spaced apart from an outer surface of the adjustment member in the proximal direction compared to the adjustment member support surface.

9. The spinal fusion cage of claim 7, wherein an outer fastening portion is formed on an outer surface of the proximal movable block.

10. The spinal fusion cage of claim 7, wherein the proximal movable block comprises an inner fastening portion spaced apart from an outer surface of the adjustment member in the proximal direction compared to the adjustment member support surface, and an outer fastening portion formed on an outer surface of the proximal movable block.

11. The spinal fusion cage of claim 1, wherein a first tool fastening portion binding to a tool is formed on an outer surface of the removable portion.

12. The spinal fusion cage of claim 11, wherein a second tool fastening portion is formed on an outer surface of an adjustment member head which is formed at one side of the adjustment member in the proximal direction so as to bind to the tool.

13. The spinal fusion cage of claim 12, wherein the first tool fastening portion and the second tool fastening portion have the same cross sections.

14. The spinal fusion cage of claim 12, wherein the connection portion is arranged along a proximal edge of the adjustment member head, and the connection portion comprises at least two connection units.

15. The spinal fusion cage of claim 14, wherein each connection unit comprises a notch facing an inner circumferential side or an outer circumferential side of the adjustment member head.

16. The spinal fusion cage of claim 11, wherein the inside of the removable portion is penetrated.

17. The spinal fusion cage of claim 1, wherein the first guide portion comprises a pillar protruding toward the second end plate, and the second guide portion comprises an extension wall protruding toward the first end plate so as to be slidable with respect to the pillar.

18. The spinal fusion cage of claim 17, wherein an accommodation portion is formed around the pillar to receive the extension wall when the first end plate and the second end plate approach.

19. The spinal fusion cage of claim 17, wherein a guide recess is formed on the extension wall to guide the insertion of the pillar.

20. A spinal fusion cage, comprising:
a first end plate and a second end plate which are configured to contact adjacent vertebral bodies;
a distal movable block fixed to be movable relative to plate slope portions formed on one end of the first end plate and one end of the second end plate;
a proximal movable block fixed to be movable relative to plate slope portions formed on another end of the first end plate and another end of the second end plate;
an adjustment member rotatably fixed to the proximal movable block and screwed to the distal movable block to adjust a distance between the distal movable block and the proximal movable block;
a first guide portion formed on the first end plate toward the second end plate; and
a second guide portion formed on the second end plate toward the first end plate to limit, by sliding with the first guide portion, a movement direction in which the first end plate and the second end plate are moved close to or away from each other,
a removable portion which is connected to the adjustment member via a connection portion, and is disconnected from the adjustment member when a predetermined torque is applied to an end portion of the adjustment member in a proximal direction,
a first bone screw inserted through a first bone screw hole formed on the first end plate and a second bone screw inserted through a second bone screw hole formed on the second end plate,
wherein the first guide portion and the second guide portion support a load in the length or width direction of the first end plate and the second end plate, and
wherein a block slider is formed on each of the distal movable block and the proximal movable block, and a plate slider slidable with respect to the block slider is formed on the plate slope portion.

* * * * *